United States Patent

Penfold et al.

[11] 3,938,566
[45] Feb. 17, 1976

[54] TREE HARVESTER DELIMBING CONTROL

[75] Inventors: Garn Farley Penfold, East Moline, Ill.; Andrew Paul Redman, Dubuque, Iowa

[73] Assignee: Deere & Company, Moline, Ill.

[22] Filed: Apr. 21, 1975

[21] Appl. No.: 570,203

[52] U.S. Cl. ............................................. 144/2 Z
[51] Int. Cl.² .................... A01G 23/08; B27L 1/00
[58] Field of Search ........ 144/2 Z, 3 D, 34 R, 34 E, 144/309 AC

[56] References Cited
UNITED STATES PATENTS

| | | | |
|---|---|---|---|
| 3,590,760 | 7/1971 | Boyd .................................. | 144/2 Z X |
| 3,642,041 | 2/1972 | Hamilton et al. ................ | 144/309 AC |
| 3,731,719 | 5/1973 | Pierrot et al. .................... | 144/2 Z |
| 3,833,034 | 9/1974 | Menzel et al. .................... | 144/2 Z X |

*Primary Examiner* — Travis S. McGehee
*Assistant Examiner* — W. D. Bray

[57] ABSTRACT

An articulated, four-wheel drive tree harvesting machine includes a front frame section upon which a felling boom assembly, a delimber assembly, and a feed assembly are mounted. The felling boom assembly is operable for severing a tree and lowering it into a generally horizontal position. The tree is released into the opened knives of the delimber assembly which close to encircle the trunk and into the opened feed rolls of the feed assembly which close to engage the trunk. The feed rolls are then rotatably driven to draw the tree trunk through the knives while the felling boom may be operated to sever and position a second tree. Two solenoid-operated valves control the operation of hydraulic cylinders which respectively open and close the delimber knives and open and close the feed rolls. Two other solenoid operated valves respectively control the operation of a clutch and a transmission to drive the feed rolls in a forward or reverse direction of rotation. A delimbing sequence and cycle may be automatically or manually controlled. Once the sequence is chosen, the frame sections are in line, and the cycle initiated, electronic logic circuitry will energize the appropriate solenoids to either close the knives, then close the rolls, and then engage the drive or close the rolls, then engage the drive, and then close the knives. Upon completion of the delimbing cycle, the cycle may be reset so that the electric logic circuitry will open the knives and rolls. Manual control circuitry is provided to permit individual control of the solenoids by manually-actuated switches.

28 Claims, 2 Drawing Figures

TREE HARVESTER DELIMBING CONTROL

BACKGROUND OF THE INVENTION

The present invention relates to a tree harvesting machine and more particularly to a control system to be used in a tree harvesting machine of the type disclosed in U.S. Pat. No. 3,833,034 granted to Menzel et al on Sept. 3, 1974, and having the same assignee as the present application.

The tree harvesting machine disclosed in the above-identified patent includes a delimber assembly having openable and closable delimber knives and a feed assembly having openable, closable and rotatable feed rolls. A boom located on the machine includes a felling head which severs a tree which is then positioned by the boom in the delimber and feed assemblies in a delimbing position. The delimber and feed assemblies include solenoids which actuate valving for controlling hydraulic cylinders to position the delimber knives and feed rolls through solenoid actuated valving and hydraulic cylinders, and include solenoids which actuate valving for controlling hydraulically operable clutch and reversing means in the feed roll drive transmission to selectively effect forward and reverse driving of the feed rolls.

In the past, only manual, individual control of the valves, clutch, and the transmission were possible which required the operator's attention at the delimber and feed assemblies during the delimbing cycle. The operator was not free to select or cut other trees while the delimbing cycle was in operation and this reduced the cycle time and hence the cost effectiveness of the entire machine. Further, the sequencing of the delimbing cycle was controlled manually for each cycle rather than being automatically selectable which further reduced the cycle time.

Further, past systems relied on limit switches or proximity sensors to initiate different portions of the cycle. A system of this sort is disclosed in the U.S. Pat. No. 3,586,078 granted to Hamilton on June 22, 1971. The disadvantage of this system is the remote wiring and additional switching required as compared to a time cycled system.

SUMMARY OF THE INVENTION

It is a general object of the present invention to provide a control system for a tree harvesting machine for automatically controlling the delimber and feed assembly operations to thereby decrease the cycle time and thus provide for cost effective harvesting and delimbing of trees.

The control system includes electrical circuitry for automatic control of the delimbing operation in a selectable sequence of closing and opening the knives, closing and opening the rolls, and engaging and disengaging the drive to the rolls. The electrical circuity also provides for manual switch control of the operation.

DESCRIPTION OF THE PREFERRED EMBODIMENT

Figure 1:
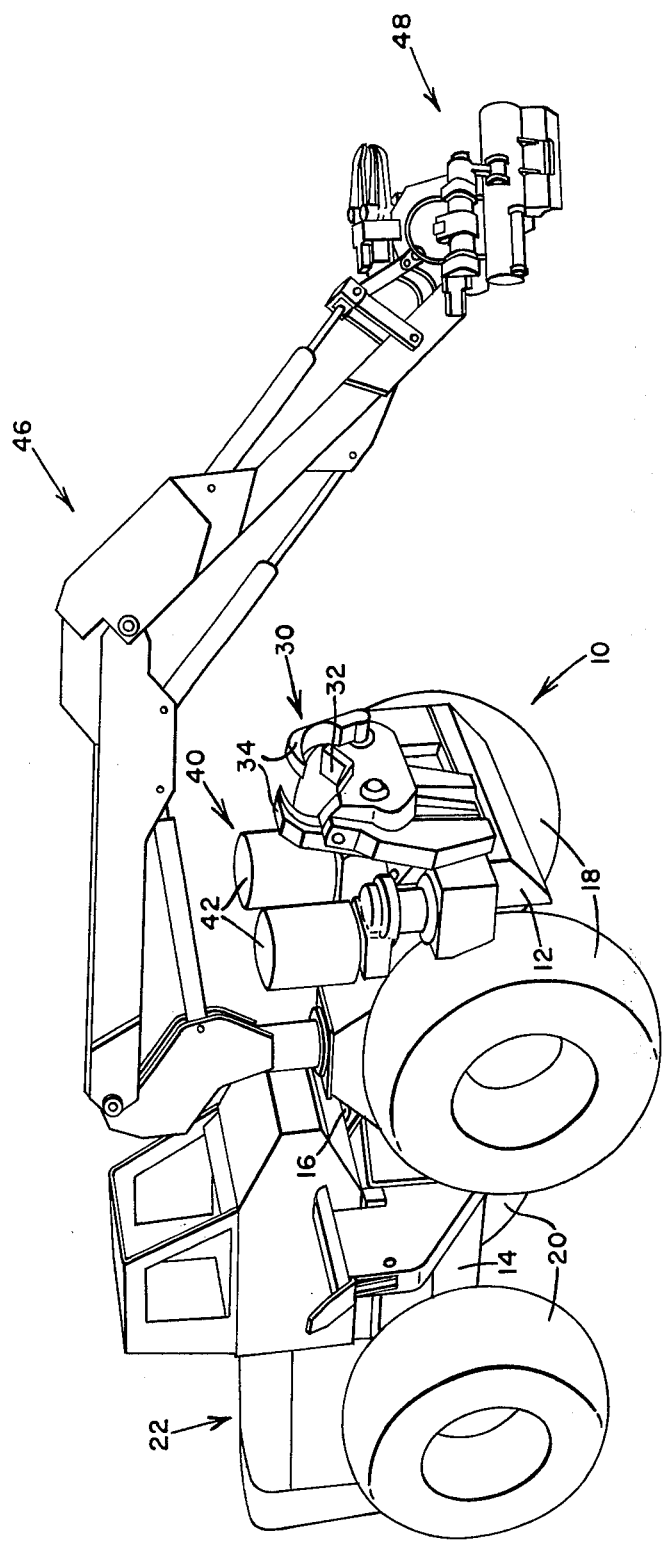
FIG. 1 is a perspective overall view of a tree harvesting machine embodying the control system of the present invention.
Figure 2:
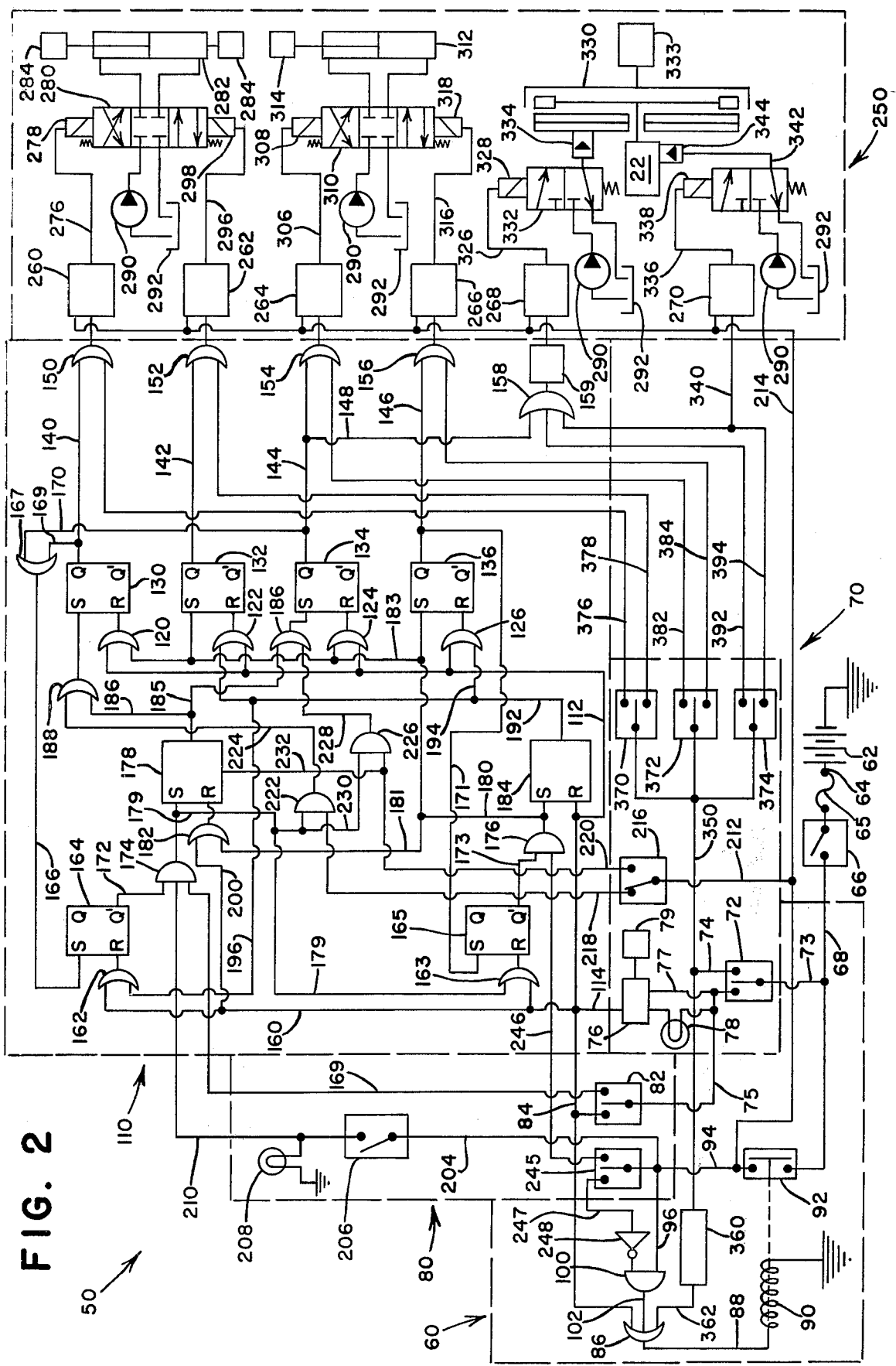
FIG. 2 is a schematic diagram of the control system showing conventional elements symbolically.

Referring now to FIG. 1, therein is shown a tree harvesting machine, as is known in the art and as exemplified in U.S. Pat. No. 3,833,034 granted to Menzel et al, indicated in its entirety by the reference numeral 10. The harvester 10 is constructed so as to be highly maneuverable in most conditions of terrain found in forested areas and for this purpose includes an articulated chassis comprising front and rear frame sections 12 and 14, respectively, which are connected together for relative movement about a vertical pivot axis defined by pin means, shown partially at 16. The front and rear frames are supported by front and rear pairs of driven ground engaging wheels 18 and 20, respectively.

Mounted on the rear frame section 14 is a prime mover 22 including an engine and related transmissions for the engine powered functions of the harvester 10.

Mounted on the forward end portion of the front frame section 12 is a delimber assembly 30 which includes an upwardly open V-shaped knife 32 and a pair of pivotally openable and closable delimber knives 34. The knives 34 which have the knife edges facing forward open to allow a tree trunk to be placed on the V-shaped knife 32 and then close to encircle the tree trunk.

A tree feed assembly 40 is located rearwardly of the delimber assembly 30 for propelling a tree trunk rearwardly when the trunk is encircled by the delimber assembly 30 thereby causing the limbs to be severed from the trunk. The feed assembly 40 includes a pair of feed rolls 42 which are provided with spikes (not shown) or some other means for aggressively engaging a tree trunk and which are mounted for being swung about respective vertical axes spaced from vertical longitudinal axes thereof so as to be movable away and towards one another to respectively receive and engage a tree trunk. The two feed rools 42 are driven by the prime mover 22 in a conventional manner so as to be selectively and reversibly rotatable about their longitudinal, vertical axes.

Mounted on the rear portion of the front frame section 12 just forwardly of the pivot pin 16 is a felling boom assembly 46. A felling head 48 is carried by the boom assembly 46 at the end opposite the mounting. The felling head 48 severs a tree and grasps it so that the trunk may be manipulated by the boom assembly 46 so as to drop the butt end portion of the trunk on to the V-shaped knife 32 of the delimber assembly 30 when the delimber knives 34 are in their open, tree trunk receiving position.

A control system for controlling the delimber assembly 30 and the feed assembly 40, as will hereinafter be described, is designated in its entirety by the reference numeral 50. The control system 50 includes five major sections each of which will hereinafter be described: a power circuitry section 60, a manual control circuitry section 70, an automatic control circuitry section 80, a logic circuitry section 110, and an actuator section 250.

The power circuitry section 60 and the logic circuitry section 110, as is fully described below, include a plurality of AND and OR gate logic circuits coupled to a plurality of bi-stable flip-flop circuits for correlating manually and automatically initiated input signals for controlling the proper sequence of operation of the delimber assembly 30 and the feed assembly 40. The AND and OR gate circuits and the flip-flop circuits are all conventional circuits and are illustrated in block form. The AND gates may be of any type having a plurality of input connections and a single output connection which permit electrical flow between the input and output connections only when there is an input at all the input connections. The OR gate likewise may be of any type having a plurality of input connections and a single output connection which permit electrical flow between the input and output connections when there is an input at one or more of the input connections. The flip-flop circuits may be of any type having "set" and "reset" inputs S and R and "set" and "reset" outputs Q and Q' and operable for alternately switching a source of electrical energy to the "set" and "reset" outputs Q and Q' in response respectively to electrical pulse inputs to the "set" and "reset" input connections S and R and maintaining the switched position and output in the absence of further electrical inputs.

The power circuitry section 60 controls the power for the control system 50 and is connected to any suitable source 62 of electrical energy such as a battery. The source 62 is connected by a lead 64 to a fuse 65 and thence to an ignition switch 66 which selectively connects and disconnects the fuse 65 with a main power lead 68 of the power section 60.

The manual control circuitry 70 includes a three-position rocker switch or mode switch 72 which is connected by a lead 73 to the main power lead 68. The mode switch 72 selectively connects or disconnects the lead 73 from a manual control lead 74 in a "manual" position and an automatic control lead 75 in an "automatic" position. The automatic control lead 75 is connected to internally grounded, memory-switching circuitry 76 of known circuit configuration by a lead 77 and an automatic operation indicator light 78. The output of the memory-switching circuitry 76 is connected to conventional voltage regulating circuitry 79 which supplies regulated power in a conventional manner to the logic circuitry section 110.

The automatic control circuitry section 80 includes a normally open, three-position, momentary contact, toggle switch or start switch 82 which is connected to the manual control circuitry section 70 by the automatic control lead 75. The start switch 82 is selectively movable between "set" and "start" positions to respectively disconnect and connect the automatic control lead 75 to a main set lead 84 and to a main start lead 169.

The main set lead 84 is connected to the input of a latching OR gate 86 in the power section 60. The output of the OR gate 86 is connected by a lead 88 to a latching solenoid 90. The latching solenoid 90 is operatively connected to a normally open, two-position latch switch 92 which is closable to connect the main power lead 68 to a power lead 94. The latching solenoid 90 when energized closes the latching switch 92. The power lead 94 is connected by a lead 96 to the input of a latching AND gate 100, the output of which is connected by lead 102 to the input of the latching OR gate 86.

The logic circuitry section 110 includes a first set lead 112 which is connected to the main power lead 84. The first set lead 112 is connected by a logic power switching lead 114 to the memory-switching circuitry 76. The lead 112 is further connected to the inputs of OR gates 120, 122, 124, and 126. The outputs of the OR gates 120, 122, 124, and 126 are connected respectively to the "reset" inputs R of a close-knives flip-flop 130, an open knives flip-flop 132, close rolls flip-flop 134, and an open rolls flip-flop 136 which are respectively in turn connected by an automatic close-knives lead 140, and automatic open-knives lead 142, an automatic close-rolls lead 144, and an automatic open-rolls lead 146 to a close-knives OR gate 150, an open knives OR gate 152, a close-rolls OR gate 154, and an open-rolls OR gate 156. The automatic close rolls lead 144 is further connected by an automatic engage-drive lead 148 to a engage-drive OR gate 158, the output of which is connected to a conventional timer, drive timer 159. The drive timer 159 is of the type which receives a continuous input and after a predetermined interval of time provides a continuous output unitl the input ceases.

The logic circuitry section 110 further includes a second set lead 160 which is also connected to the main power lead 84. The second set lead 160 is connected to the inputs of a start OR gate 162 and a reset OR gate 163, the outputs of which are connected to the "reset" inputs R respectively of a start lockout flip-flop 164 and a reset lockout flip-flop 165. The "set" input S of the start lockout flip-flop 164 is connected by a lead 166 which is connected to the output of a start lockout OR gate 167, the inputs of which are connected by a lead 169 and a lead 170, to the automatic close-knives lead 140 and the automatic close-rolls lead 144, respectively. The "set" input S of the reset lockout flip-flop 165 is connected by a lead 171 to the automatic open-rolls lead 146. The Q' outputs of the flip-flops 164 and 165 are connected by leads 172 and 173 respectively to the inputs of a start AND gate 174 and a reset AND gate 176.

The output of the start AND gate 174 is connected to the "set" input of a conventional main timer 178. The main timer 178 may be of any type having "set" and "reset" inputs S and R and a single output and operable for producing a pulse after a time delay in response to an electrical pulse signal being connected to the "set" input S and being resettable in response to an electrical pulse signal being connected to the "reset" input R. The main timer 178 is further changeable to provide two different time delays upon receipt of an additional input signal as will be hereinafter explained. Connected to the output of the start AND gate 174 is a lead 179 which is connected to the input of the reset OR gate 163. Connected to the output of the reset AND gate 176 is a lead 180 which is connected through a lead 181 to the input of a timer OR gate 182. The lead is further connected to the "set" input S of the rolls-open flip-flop 136. A lead 183 further connects the lead 181 to the inputs of the OR gates 120 and 124, and to the "set" input S of the open-knives flip-flop 132.

The output of the reset AND gate 176 is likewise connected to the "set" input S of another conventional timer, reset timer 184. The reset timer 184 may be of any type having "set" and "reset" inputs S and R and a single output and operable for producing pulse after a time delay in response to an electrical pulse signal being connected to the "set" input S and being resettable in response to an electrical pulse signal being connected to the "reset" input R.

The output of the main timer 178 is connected by a lead 185 to the input of an OR gate 186, the output of which is connected to the "set" input S of the close-rolls flip-flop 134. Connected to the lead 185 by a lead 186 is an OR gate 188, the output of which is connected to the "set" input S of the close-knives flip-flop 130.

The output of the reset timer 184 is connected by a lead 192 to the input of the OR gate 122 and by a lead 194 to the input of the OR gate 126. The lead 192 is further connected by a lead 196 to the input of the start OR gate 162.

Also connected to the second set lead 160 is a lead 200 which is connected to the input of a timer OR gate 182, the output of which is connected to the "reset" input R of the main timer 178.

Referring now to the automatic control circuitry section 80, there is shown a power lead 204 which connects the main power lead 94 to a normally open, frame-in-line switch 206. The switch 206 is connected by a lead 210 to the input of the start AND gate 174. Also connected to the lead 210 is a frame-in-line indicator light 208 which is lighted when the switch 206 is closed.

Referring again to the manual control circuitry section 70, therein is shown a power lead 212 connected by a driver power lead 214 to the main power lead 94 in the power circuitry section 60. The power lead 212 is connected to a two-position, three-way, close first switch 216 which selectively interconnects the power lead 212 to a lead 218 in a "close knives first" position and a lead 220 in a "close rolls first" position. The lead 218 is connected to the input of a knives-first AND gate 222. The output of the knives-first AND gate 222 is connected by a lead 224 to the input of the OR gate 188. The lead 220 is connected to the input of a rolls-first AND gate 226. The output of the rolls-first AND gate 226 is connected by a lead 228 to the input of the OR gate 186. The inputs of the knives-first AND gate 222 and the rolls-first AND gate 226 are connected together by a lead 230 which is further connected to the lead 179. The lead 220 is further connected by a timer-change lead 232 to the time changing input of the main timer 178.

Referring again to the automatic control circuitry section 80, therein is shown a normally-open three-position, momentary-contact toggle switch or stop switch 245 which selectively interconnects the main power lead 94 to a reset lead 246 in a "reset" position and an inverter lead 247 in a "stop" position.

The inverter lead 247 is connected to the input of a conventional inverter circuit 248 which provides an output as long as there is no input of the inverter circuit 248 is connected to the input of the latching AND gate 100.

Referring now to the actuator section 250, this section is connected to the power circuitry section 60 by the aforementioned driver power lead 214 which is connected to supply power to a close and an open knives, a close and an open rolls, and an engage drive and a reverse drive driver circuits 260, 262, 264, 266, 268, and 270, respectively.

The close-knives driver circuit 260 is connected to the output of the OR gate 150 of the logic circuitry section 110 and selectively connects and blocks the driver power lead 214 to and from a solenoid lead 276. The solenoid lead 276 is connected to a close-knives solenoid 278 which positions a delimber control valve 280 on one side of a neutral, ports blocked position to connect a fluid pump 290 and a reservoir 292 to a first port in the head end and a second port in the rod end, respectively, of a delimber hydraulic cylinder 282 which is connected at head and rod to conventional delimber actuator links illustrated in block form by 284 which are in turn connected to the knives 34.

The open-knives driver circuit 262 is connected to the output of the OR gate 152 and selectively connects and blocks the driver power lead 214 to and from a solenoid lead 296. The solenoid lead 296 is connected to an open-knives solenoid 298 which positions the delimber control valve 280 on the other side of the neutral position to connect the fluid pump 290 and the reservior 292 to the second and first ports, respectively, of the delimber hydraulic cylinder 282.

The close-rolls driver circuit 264 is connected to the output of the OR gate 154 and selectively connects and blocks the driver power lead 214 to and from a solenoid lead 306. The solenoid lead 306 is connected to a close-rolls solenoid 308 which positions a feed roll control valve 310 on one side of a neutral, ports blocked position to connect the fluid pump 290 and the reservoir 292 to a first port in the head hydraulic cylinder 312 which has its rod connected to a conventional feed actuator linkage illustrated in block form by 314 which is in turn connected to both feed rolls 42.

The open-rolls driver circuit 266 is connected to the output of the OR gate 156 and selectively connects and blocks the driver power lead 214 to an from a solenoid lead 316. The solenoid lead 316 is connected to an open rolls solenoid 318 which positions the feed roll control valve 310 on the other side of the neutral position to connect the fluid pump 290 and the reservoir 292 to the second and first ports, respectively, of the feed hydraulic cylinder 312.

The engage-drive driver circuit 268 is connected to the output of the drive timer 159 and selectively connects and blocks the driver power lead 214 to and from a solenoid lead 326. The solenoid lead 326 is connected to an engage-drive solenoid 328 which positions a drive control valve 332 on one side of a normal position wherein the reservoir 292 is connected to a clutch actuator 334 to a second position wherein the fluid pump 290 is connected to the clutch actuator 334 which acts to respectively disengage and engage a conventional clutch 330. The clutch 330 engages to connect the prime mover 22 to conventional feed roll gearing illustrated in block form by 333 which drives the two feed rolls 42.

The reverse driver circuit 270 is connected to a reversing output lead 340 and selectively connects and blocks the driver power lead 214 to and from a solenoid lead 336. The solenoid lead 336 is connected to a reverse-drive solenoid 338 which positions a reversing control valve 342 on one side of a normal position wherein the reservoir 292 is connected to a transmission actuator 344 to a second position wherein the fluid pump 290 is connected to the transmission actuator 344 which acts to respectively deactivate and activate a conventional reversing portion of the transmission in the prime mover 22. When the transmission actuator 344 is deactivated, the prime mover 22 driving through the clutch 330 rotates the feed rolls 42 in a normal, forward direction of rotation which propels a tree trunk rearwardly of the harvester 10 through the rolls 42 and, when the transmission actuator 344 is activated, the feed rolls 42 are reverse driven to eject a tree trunk forwardly of the harvester 10.

Referring again to the manual circuitry control section 70, the mode switch 72 when switched to a manual position will interconnect the lead 73 to the manual control lead 74 which is connected to a manual power lead 350 which is connected to a conventional pulse timer circuit 360. The pulse timer circuit 360 is of any type which will produce output in response to a continuous signal input. The pulse timer circuit 360 is connected by a pulse timer lead 362 to the input of the latching OR gate 86.

The manual power lead 350 is further connected to a manual knives switch 370, a manual feed rolls 372, a manual feed drive switch 374. The manual knives switch 370 selectively interconnects and disconnects the manual power lead 350 with a manual close-knives lead 376 and a manual open-knives lead 378 which in turn are connected to the inputs of the OR gates 150 and 152, respectively. The manual feed rolls switch 372 selectively interconnects and disconnects the manual power lead 350 with a manual close-rolls lead 382 and a manual open-rolls lead 384 which in turn are connected to the inputs of the OR gates 154 and 156, respectively. The manual feed drive switch 374 selectively interconnects and disconnects the manual power lead 350 with a manual drive engagement lead 392 and a manual reverse drive lead 394 which are connected to the inputs of the OR gate 158. The manual reverse drive lead 394 is further connected to the reversing output lead 340.

To operate the harvester 10, the operator switches on the ignition switch 66 to connect the electrical power source 62 to the mode switch 72. When automatic control of the delimbing cycle is desired, the operator switches the mode switch 72 from the center "off" position to the "automatic" position thereby connecting the source 62 to the memory-switching circuitry 76 and the start switch 82.

At initial start up, the start switch 82 is momentarily closed to the "set" position to provide a momentary contact between the automatic control lead 78 and the main set lead 84 to produce a pulse set signal. The set signal is sent to the latching OR gate 86 which produces an output to energize the latching solenoid 90 long enough to close the latch switch 92 to cause a current flow to the lead 96 which provides an input to the latching AND gate 100. The latching AND gate 100 in response to the input from the lead 96 and the normally present output of the inverter 248 in the absence of a singal from the stop switch 245 provides an output to the input of the OR gate 86 which "latches" or maintains the closed position of the latch switch 92.

The set signal further switches the memory-switching circuitry 76 to an "on" condition to connect the source 62 to the voltage regulating circuitry 79 and thence to the logic circuitry section 110. The memory-switching circuitry remembers the pulse signal to turn "on" and light the light 78, and responds to the opening of the mode switch 72 from the "automatic" position or the opening of the ignition switch 66 to block the source 62 from the logic circuitry section 110. The set signal simultaneously provides an input to the OR gates 120, 122, 124, and 126 which in turn provide reset inputs to the flip-flops 130, 132, 134, and 136, to switch their respective outputs Q to zero. The set signal further provides an input to the OR gates 162 and 163 to produce outputs therefrom to the start and reset lockout flip-flops 164 and 165 to provide outputs Q' to provide inputs to the start and reset AND gate 174 and 176. The set signal further provides an input to the timer OR gate 182 which provides an output to reset the main timer 178 and an input to reset the reset timer 184.

Once the power circuitry section 60 and the logic circuitry section 110 have been set, the operator drives the harvester 10 into a position between a number of trees and straightens out the articulated vehicle. When the rear and front frame sections 12 and 14 are in line, the frame-in-line switch 206 is closed which lights the frame-in-line indicator light 208 and connects the source 62 to the input of the start AND gate 174.

The operator then selects a suitable tree, and, depending upon how far up on the tree stem the branches start, switches the close first switch 216 to close the knives first or to close the feed rolls first. For example, if the branches are close to the point where the tree is to be cut, it would be desirable to close the delimber knives 34 before the feed rolls 42 to sever limbs as soon as the trunk starts into the feed rolls 42. Conversely, if the tree trunk is relatively clear of branches until far up from the place where the tree will be cut, it would be desirable to switch to close the feed rolls 42 first and then close the delimber knives 34. If the knives 34 are to be closed first, the close first switch 216 will connect the source 62 to the input of the AND gate 222 and, if the feed rolls 42 are to be closed first, the source will be connected to the input of the AND gate 226.

Upon selection of the tree, the boom assembly 46 is activated so as to position the felling head 48 at the base of the tree trunk. The felling head 48 cuts and grips the tree trunk so that it may be manipulated by the boom assembly 46 to position the butt of the tree trunk between the feed rolls 42.

To initiate the automatic delimber cycle, the operator momentarily closes the start switch 82 to the "start" position to connect the automatic control lead 75 to the main start lead 169 to provide the necessary input pulse to produce an output pulse from the start AND gate 174. The output from the start AND gate 174 activates the main timer 178 to start the running of a period of time, approximately 1.1 seconds, before an output pulse signal will be produced. The output from the AND gate 174 further provides an input to the reset OR gate 163 to switch the reset lockout flip-flop 165 to provide an input to the reset AND gate 176. The output of the AND gate 174 still further provides inputs to the AND gates 222 and 226.

When it is desired to close the delimber knives first, the close first switch 216 is switched to connenct the power lead 212 to the input of the AND gate 222. With the outputs from the start AND gate 174 and the switch 216, the AND gate 222 is activated to provide an input to the OR gate 188. The output of the OR gate 188 provides a set input to the close-knives flip-flop 130 which switches to provide an output at Q to the input of the OR gate 150. The output at OR gate 150 activates the close-knives driver circuit 260 to cause the close-knives solenoid 278 to be energized to position the delimber control valve 280 so as to connect the fluid pump 290 and the reservoir 292 to the delimber hydraulic cylinder 282 to urge the delimber actuator links 284 to close the knives 34.

The output from the close-knives flip-flop 130 further provides an input to the OR gate 167 to set the start lockout flip-flop to stop the output at Q' to the input of the start AND gate 174 and thus prevent subsequent activation by additional start pulse signals.

The output of the main timer 178 after 1.1 seconds in response to the output of the start AND gate 174 provides an input to the OR gate 186 which provides an output to the "set" input S of the close-rolls flip-flop 134. The close-rolls flip-flop 134 in turn switches to produce an output to Q the input of the OR gate 154. The resulting output of the OR gate 154 activates the close-rolls driver 164 to cause the close-rolls solenoid 308 to be energized to position the feed roll control valve 310 so as to connect the fluid pump 290 and the reservoir 292 to the feed hydraulic cylinder 312 to urge the feed actuator linkage 314 to close the feed rolls 42.

The output of the close-rolls flip-flop 134 further provides an input to the OR gate 158. The output of the OR gate 158 is provided to the driver timer 159. After a predetermined delay of 1.1 seconds, an output signal is provided by the driver timer 159 to the engage-drive solenoid 328 to cause the clutch 330 to engage and the prime mover 22 to rotate the rolls 42.

Thus, the control system 50 automatically closes the delimbing knives and after a first predetermined delay closes the feed rolls, and after a second predetermined delay starts the rotation of the feed rolls.

When it is desired to close the feed rolls first, the close first switch 216 is switched to connect the power lead 212 to the input of the AND gate 226. With the outputs from the start AND gate 174 and the switch 216, the AND gate 226 is activated to provide an input to the OR gate 186. The output of the OR gate 186 provides a set input to the close rolls flip-flop 134 which switches to provide an output at the Q to the input of the OR gate 154. The output of OR gate 154 activates the close-rolls driver circuit 264 to cause the close rolls solenoid 308 to be energized to urge the feed rolls closed as aforein described. The output of the close-rolls flip-flop 134 further switches the start lockout flip-flop 164 to its zero output at Q' position and engages the clutch 330 after a time delay as aforein described.

The closing of the close-first switch 216 to the feed rolls first position also provides a pulse signal through time change lead 240 to the main timer 178 to change the length of time delay. After a predetermined delay of 2.2 seconds, sufficient for the rolls 42 to close and the drive 330 clutch to engage, the main timer 178 produces a signal in response to the start signal which acts to produce an output from the OR gate 188 which provides a set input to the close knives flip-flop 130. The output from the close knives flip-flop 130 sets the start lockout flip-flop 164, and closes the knives 34 as aforein described.

After a tree trunk has passed through the delimber assembly 30 and the tree feed assembly 40 and has been completely delimbed, it falls to the ground. The operator then prepares for the next tree which has been selected and cut during the delimbing cycle by momentarily closing the stop switch 245 to the "reset" position to connect the main power lead 94 to the reset lead 246. The momentary closing provides a reset signal to the reset AND gate 176. Since the set and start signals have provided an output at Q' of the reset lockout flip-flop 165, the reset AND gate 176 is activated to provide an input to the timer OR gate 182 which in turn provides a reset input to the main timer 178.

The output of the reset AND gate 176 further provides inputs to the OR gates 120 and 124 which produce outputs to reset the close-knives flip-flop 130 and the close-rolls flip-flop 134 and zero their outputs at Q. The output from the reset AND gate 176 further provides set inputs to the open-knives flip-flop 132 and the open-rolls flip-flop 136. The open-knives flip-flop 132 provides an output to the OR gate 152 which in turn switches the open-knives driver circuit 162 to energize the open knives solenoid 298 to position the delimber control valve 280 to cause the delimber hydraulic cylinder 282 to open the knives 34. Similarly, the open-rolls flip-flop 136 provides an output to the OR gate 156 which switches the open-rolls driver circuits 266 to energize the open-rolls solenoid 318 to position the feed roll control valve 310 to cause the feed hydraulic cylinder 312 to open the feed rolls 42.

The output of the open-rolls flip-flop 136 further provides a set input to the reset lockout flip-flop 165 which switches the output at Q' to zero eliminating one of the inputs necessary to the reset AND gate 176 and thus preventing subsequent activation by additional reset pulse signals until a start signal is received.

The output of the reset AND gate 176 further provides a set input to the reset timer 184 which in turn produces an output pulse after a delay of 1.1 seconds which resets the start lockout flip-flop 164, resets the open-knives flip-flop 132, and resets the open-rolls flip-flop 136.

Thus, with the delimbing cycle reset, the harvesting machine 10 is ready to receive another tree trunk between the feed rolls 42 and for another automatic delimbing cycle to be started.

In the automatic mode, there are two primary ways of stopping the delimbing cycle. The first is by momentarily closing the start switch 82 to the "set" position which automatically provides reset signals to the flip-flops 130, 132, 134, and 136, and thus zeroing their outputs so that the solenoids 278, 298, 308, 318, 328 and 338 are de-energized allowing the control valves 280, 310, 332, and 342 to be returned to their ports blocked or reservoir connected positions, respectively. The second way is to momentarily close the stop switch 245 to the "stop" position which will connect the source 62 to the inverter circuit 248. The connection inverts the inverter circuit 248 output and deactivates the latching AND gate 100 which will de-energize the latching solenoid 90 and open the latch switch 92 to shut off power to the control system 50. It should be noted that a third way of stopping the cycle and the entire harvester 10 is by opening the ignition switch 66.

For manual operation of the knives, the feed rolls, and the feed roll drive, the operator switches the mode switch 72 to the "manual" position. In the manual position, the mode switch 72 connects the source 62 to the pulse timer 360 which emits a pulse signal to the input of the OR gate 86 to momentarily energize the latching solenoid 90 and close the latch switch 92. The latch switch 92 is held closed by the latching solenoid 90 long enough for the source 62 acting through the latching AND gate 100 and the latching OR gate 86 to energize the latching solenoid 90. This arrangement permits electrical power cutoff to the actuator section 250 by means of the "stop" position in the stop switch 245 even when in the manual mode of operation.

In the manual position, the mode switch 72 further connects the source 62 to the manual knives switch 370, the manual feed rolls switch 372, and a manual feed drive switch 374. By selectively closing the switches 370 and 372, the operator can individually close and open the knives 34 and the feed rolls 42. By closing the manual feed drive switch 374 to the "engage-drive" position, the operator connects the input of the OR gate 158 to the source 62. The output of the OR gate 158 provides an input to the drive line 159 to engage the clutch 330 after the 1.1 second delay. By closing the manual feed drive switch 390 to the "reverse drive" position, the operator connects the source 62 to the input of the OR gate 158 as above and also connects the source 62 to the reverse-drive driver circuit 270 to reverse the prime mover 22 transmission. Thus, the transmission is reversed and then, after 1.1 seconds, the drive is engaged.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a tree harvesting machine having main frame means elongated in a normal fore-and-aft direction of travel supported by ground engaging means, delimber means mounted on the forward end portion of said frame means for receiving and encircling and delimbing a tree as the latter is fed endwise therethrough, feed means mounted on said frame means behind said delimber means for receiving and engaging and propelling a tree through said delimber means, and extendable and retractable tree handling means mounted on said frame means for manipulating a tree into a position for introducing the butt end portion thereof into said delimber and feed means, a control system comprising: control means for producing a start and reset signals; logic means connected to the control means responsive to the start signal to provide a close-delimber, a close-feed, and an engage-drive outputs and responsive to the reset signal to provide an open-delimber and an open-feed outputs; delimber actuator means operatively associated with the delimber means responsive to the close- and open-delimber outputs to position the delimber means between its respective encircling and receiving positions; feed actuator means operatively associated with the feed means responsive to the close- and open-feed outputs to position the feed means between its respective engaging and receiving positions; and normally disengaged drive means operatively associated with the feed means responsive to the engage-drive output to engage to drive the feed means to propel a tree through the delimber means.

2. The tree harvesting machine as claimed in claim 1 wherein the logic means includes means for sequencing the outputs to provide the close-delimber output first, the close-feed output second, and the engage-drive output third.

3. The tree harvesting machine as claimed in claim 2 wherein the control means includes manually operable means for providing a close-feed first signal and the logic means includes change means operatively associated with the sequencing means to provide the close-feed output first, the engage-drive output second, and the close-delimber output third.

4. The tree harvesting machine as claimed in claim 1 wherein the control means includes means for pulsing the start and reset signals; and said logic means includes lockout means responsive to an initial pulse start signal to activate a first portion of the logic means responsive to an initial pulse reset signal and to the close-delimber and close-feed outputs to deactivate a second portion of the logic means responsive to the initial start signal and responsive to the initial pulse reset signal to activate said second portion and to the open-feed output to deactivate said first portion.

5. The tree harvesting machine as claimed in claim 1 wherein the control means includes means for providing a set signal and the logic means includes means responsive to the set signal to block the outputs.

6. The tree harvesting machine as claimed in claim 1 wherein the main frame means includes front and rear frame means pivotally interconnected; the control means includes means for sensing and providing an in-line signal to the logic means when the front and rear frame means are in line in the fore-and-aft direction; and the logic means includes means responsive to the absence of the in-line signal to block the outputs.

7. The tree harvesting machine as claimed in claim 1 wherein said control means further includes manual circuitry means connected to the logic means and having manually operable mode means selectable for deactivating at least a portion of the logic circuitry means and activating manual control means for permitting the first, second, and third actuator means to be controlled by selective operations of said manual control means.

8. In a tree harvesting machine having main frame means elongated in a normal fore-and-aft direction of travel supported by ground engaging means, delimber means mounted on the forward end portion of said frame means for receiving and encircling and delimbing a tree as the latter is fed endwise therethrough, feed means mounted on said frame behind said delimber means for receiving and engaging and propelling a tree through said delimber means, and extendable and retractable tree handling means mounted on said frame means for manipulating a tree into a position for introducing the butt end portion thereof into said delimber and feed means; a control system comprising: control means for producing a start and reset signals; logic means connected to the control means responsive to the start signal to provide a closedelimber, a close-feed, and an engage-drive outputs and responsive to the reset signal to block the close-delimber, the close-feed, and the engagae-drive outputs and to provide an open-delimber and an open-feed outputs and subsequently to block the open-delimber and open-feed outputs; delimber actuator means operatively associated with the delimber means responsive to the open- and close-delimber outputs to position the delimber means between its respective receiving and encircling positions; feed actuator means responsive to the open- and close-delimber outputs to position the feed means between its respective receiving and engaging positions; and feed drive means operatively associated with the feed means responsive to the engage-drive output to engage to drive said feed means to propel a tree through said delimber means.

9. The tree harvesting machine as claimed in claim 8 wherein the logic means includes means responsive to the start signal to provide a close-delimber signal; the logic means further includes means responsive to the close-delimber signal to provide a close-delimber output; the logic means further includes means responsive to the start signal to provide a delayed close-feed signal after a first predetermined delay; the logic means further includes means responsive to the delayed close-feed signal to provide the close-feed output; and the logic means further includes drive timer means responsive to the close-feed output to provide a delayed engage-drive signal after a second predetermined delay; and the drive timer means includes means responsive to the delayed engage-drive signal to provide the engage drive output whereby the outputs are sequenced with the close-delimber output first, the close-feed output second, and the engage-drive output third.

10. The tree harvesting machine as claimed in claim 9 wherein the control means includes close first means for selectively providing or not providing a close-feed first signal; the logic means further includes means responsive to the start signal and the close-feed first signal to block the close-delimber signal and to provide a close-feed signal; the logic means further includes means responsive to the close-feed signal to provide the close-feed output; the logic means further includes means responsive to the start signal and the close-feed first signal to provide a delayed close-delimber signal after a third predetermined delay; the logic means further includes means responsive to the delayed close-delimber signal to provide the close-delimber output whereby the outputs are sequenced with the close-feed output first, the engage-drive output second, and the close-delimber output third.

11. The tree harvesting machine as claimed in claim 8 wherein the control means includes means for pulsing the start and reset signals; said logic means includes lockout means responsive to an initial start signal pulse to activate a first portion of the logic means responsive to an intial reset signal pulse and to the close-delimber and close-feed outputs to deactivate a second portion of the logic means responsive to the initial start signal pulse and responsive to the initial reset signal pulse to activate said second portion and to the open-feed output to deactivate said first portion.

12. The tree harvesting machine as claimed in claim 8 wherein the control means includes means for providing a set signal and the logic means includes means responsive to the set signal to block the outputs.

13. The tree harvesting machine as claimed in claim 8 wherein the main frame means includes front and rear frame means pivotally connected, the control means includes means for sensing and providing an in-line signal when the front and rear frame means are in line in the fore-and-aft direction, and the logic means includes means responsive to the absence of the inline signal to block the outputs.

14. The tree harvesting machine as claimed in claim 8 wherein the control means further includes manual circuit means connected to said logic circuitry means and having manually operable mode means selectable for deactivating at least a portion of said logic circuitry means and activating manual control means for permitting the first, second, and third actuator means to be controlled by selective operation of said manual control means; said manual control means including means for providing a reverse-drive output; and the drive means includes actuator means responsive to the reverse-drive output to reverse the drive to the feed means to propel a tree out of the delimber means.

15. In a tree harvesting machine having main frame means elongated in a normal fore-and-aft direction of travel supported by ground engaging means, delimber means mounted on the forward end portion of said frame means and including fluidly actuated knife means for receiving and encircling and delimbing a tree as the latter is fed endwise therethrough, feed means mounted on said frame means behind said delimber means and fluidly movable for receiving and engaging a tree and including rotatable roll means engageable with main drive means for propelling a tree through said delimber means, and extendable and retractable tree handling means mounted on said frame means for manipulating a tree into a position for introducing the butt end portion thereof into said delimber and feed means, a control system comprising: a source of electrical energy; automatic control means connected to the source for producing a start and reset signals; logic circuitry means connected to the source including means responsive to the start signal for selectively providing sequentially a close-delimber, close-feed, and engage-drive electrical outputs and the close-feed, engage-drive, and close-delimber electrical out-puts and including means responsive to the reset signal to block the close-delimber, close-feed and engage-drive electrical outputs and to provide and subsequently to block an open-delimber and open-feed electrical outputs, delimber actuator means operatively associated with the logic means and the delimber means including driver means responsive to the close- and open-delimber electrical outputs to selectively connect the source to solenoid means for actuating valve means to connect a source of fluid pressure to actuate means to fluidly actuate the knife means between its respective encircling and receiving positions; feed actuator means operatively associated with the logic means and the feed means including driver means responsive to the close- and open-feed electrical outputs to selectively connect the source to solenoid means for actuating valve means to connect the source of fluid pressure to actuator means to fluidly move the feed means between its respective engaging and receiving positions; and feed drive means operatively associated with the logic means and the roll means including driver means responsive to the engage-drive electrical output to selectively connect the source to solenoid means for actuating valve means to connect the source of fluid pressure to actuator means to engage the roll means to the main drive means for rotating the roll means to propel a tree trunk through said delimber means.

16. The tree harvesting machine as claimed in claim 15 including manually operable close-first means connected to the logic circuitry means for selectively providing a close-knives first and a close-rolls first signal; said logic circuitry means including gate means connected to the automatic control means and the close first means responsive to the start and close-knives first signals to provide a close-knives signal and responsive to the start and close-rolls first signals to provide a close-rolls signal; said logic means further including main timer means connected to the gate means responsive to the start signal to provide a first delayed start signal after a first predetermined delay and to the start and close-rolls first signals to provide a second delayed start signal after a second predetermined delay; said logic means further including reset timer means connected to the automatic control means responsive to the reset signal to provide a delayed reset signal after a third predetermined delay; said logic means further including switching means connected to the gate means and the main timer means responsive to the close-knives signal or the first delayed signal to provide the close-delimber output and responsive to the close-rolls signal or the second delayed signal to provide the close-feed output and responsive to the reset signal to block the close-delimber and close-feed out-puts and to provide the open-delimber and open-feed outputs; and responsive to the delayed reset signal to block the open-delimber and open-feed outputs; said logic means further including drive timer means connected to the switching means responsive to the close-rolls output to provide an engage-drive signal after a fourth predetermined delay; and said drive timer means includes means responsive to the engage-drive signal to provide the engage-drive output.

17. The tree harvesting machine as claimed in claim 15 wherein the automatic control means further includes momentary contact means for momentarily providing the start and reset signals; the logic circuitry means includes start lockout means responsive to the close-delimber and close-feed outputs to deactivate the start signal responsive means and to the delayed reset signal to activate the start signal responsive means; and the logic circuitry means further includes reset lockout means responsive to the open-feed output to deactivate the reset signal responsive means and to the start signal to activate the reset signal responsive means.

18. The tree harvesting machine as claimed in claim 16 wherein the automatic control means further includes means for providing a set signal and the switching means includes means responsive to the set signal to block the outputs.

19. The tree harvesting machine as claimed in claim 16 wherein the automatic control means further includes means for providing a stop signal and means operatively associated with the source responsive to the stop signal to block the connection of the source to the logic means and the driver means.

20. The tree harvesting machine as claimed in claim 16 wherein the main frame means includes front and rear frame means pivotally interconnected; the automatic control means includes means for sensing and providing an in-line signal when the front and rear frame means are in line in the fore-and-aft direction; and the logic circuitry means includes means responsive to the absence of the in-line signal to block the start signal from the gate means and the main timer means.

21. The tree harvesting machine as claimed in claim 16 wherein the automatic control means further includes manual circuit means connected to said logic circuitry means and having manually operable mode switch means connected to the source and selectable for deactivating at least a portion of said logic circuitry means and activating manual control means for controlling the first, second, and third actuator means by selective operation of said manual control means.

22. In a tree harvesting machine having main frame means elongated in a normal fore-and-aft direction of travel and supported by ground engaging means; delimber means mounted on the forward end portion of said frame means for delimbing a tree as the latter is fed endwise therethrough; said delimber means including knife means being mounted for pivotal movement between an open and closed postions for respectively receiving and encircling a tree trunk whereby the knife means will shear the limbs from the trunk as the trunk is pulled through the encircling knife means; said knife means being movable by a first extendable and retractable hydraulic actuator means having first and second work port means arranged such that the actuator means will be placed in neutral mode when both work port means are blocked, in a first active mode for moving the knife means to the closed position when the first and second work port means are respectively connected to a source of fluid pressure and a reservoir, and in a second active mode for moving the knife means to the open position when the second and first work port means are respectively connected to the source of fluid pressure and the reservoir; feed means mounted on said frame means behind said delimber means for propelling a tree through said delimber means; said feed means including roll means being mounted for swinging movement between an open and closed positions for respectively receiving and engaging a tree trunk; said roll means being swingable by a second extendable and retractable hydraulic actuator means having first and second work port means arranged such that the actuator means will be placed in a neutral mode when both work ports are blocked, in a first mode for moving the roll means to the closed position when the first and second work port means are respectively connected to the source of fluid pressure and the reservoir, and in a second mode when the second and first work port means are respectively connected to the source of fluid pressure and the reservoir; said feed means further including roll drive means operatively associated with the roll means and being engaged and disengaged for respectively rotating and not rotating the roll means to propel and not propel a tree trunk; said roll drive means being engaged and disengaged by a third extendable and retractable hydraulic actuator means having work port means arranged such that the actuator means will be placed in a first mode for engaging the roll drive means when the work port means is connected to the source of fluid pressure and in a second mode for disengaging the roll drive means when the work port means is connected to the reservoir; first, second, and third shiftable valve means connected respectively to the first, second, and third actuator means and further connected to the source of fluid pressure and the reservoir; said first and second valve means being shiftable among first, second, and normal neutral positions for respectively placing said first and second actuators in their corresponding first, second, and neutral modes; said third valve means being normally in a second position and shiftable to a first position for placing said third actuator in its corresponding second and first modes; and extendable and retractable tree handling means mounted on said frame means for manipulating a tree into a position for introducing the butt end portion thereof into said delimber and feed means; an electrical control system for selectively controlling the shifting of said valve means, comprising: first and second solenoid means connected to each of said first and second valve means and being selectively energizable for respectively shifting the associated valve means to its first and second positions; first solenoid means connected to the third valve means to its first position; driver means having a separate energizing connection means joined to each solenoid means; said driver means including power input connection means; a source of electrical current being connected to said power input connection means; logic circuitry means having separate output connection means joined to each driver means and including electrical signal responsive switching means for providing outputs to the driver means for selectively connecting or blocking said power input connection means to or from said energizing connection means; said logic circuitry means further including a plurality of control signal input connection means connected to said switching means; a plurality of normally open input signal switch means including manually closable switch means being located between and connected to said control signal input connection means and said source of current; said manually closable switch means including start and reset manual switch means; said start manual switch means closable for commencing a delimbing cycle by connecting an electrical signal to said switching means for switching the latter to provide the outputs to the driver means to connect said source of current to said first solenoid means of said first, second, and third valve means for placing the first, second, and third actuators, respectively, in their first modes; said reset manual switch means closable for resetting the delimbing cycle by connecting an electrical signal to said switching means for switching the latter to block and provide the outputs to the driver means to respectively block said source of current from said first solenoid means of said first, second, and third valve means and connect said source of current to said second solenoid means of said first and second valve means for placing said first, second, and third valves in their second modes, and subsequently to block said source of current from said second solenoid means of said first and second valve means for respectively placing said first and second valves in their neutral modes.

23. The tree harvesting machine as claimed in claim 22 including close-first circuitry means connected to said control signal input connection means and having manually operable close-first switching means connected to said source and selectable for deactivating at least a first portion of said logic circuitry means for sequencing the second, third, and first actuator means to be positioned first, second, and third, respectively, and activating at least a second portion of said logic circuitry means for sequencing the first, second, and third actuator means to be positioned first, second, and third, respectively, and for deactivating said second portion of said logic circuitry means and activating said first portion of said logic circuitry means.

24. The invention as claimed in claim 22 wherein the start and reset manual switch means include means for pulsing the start and reset signals; said logic circuitry means includes start lockout means responsive to the output to the driver means to connect the source of current of said first solenoid of said first or second valve means to deactivate at least a first portion of said switching means responsive to the start signal pulses and responsive to the reset signal to activate said first portion; and said logic circuitry means includes reset lockout means responsive to the output to the driver means to connect the source of current to said second solenoid of said second valve means to deactivate at least a second portion of said switching means responsive to the reset signal pulses and responsive to the start signal to activate said second portion.

25. The invention claimed in claim 22 wherein the manually closable switch means further includes set manual switch means; said set manual switch means closable for readying said logic circuitry means for a delimbing cycle by connecting an electrical signal to said switching means for switching the latter to block the outputs to the driver means to block said source of current from said first and second solenoid means of the first and second valve means and the first solenoid means of the third valve means.

26. The tree harvesting machine as claimed in claim 22 wherein the manually closable switch means further includes stop manual switch means for providing a stop signal; and including power control means connected between the source and the power input connection means and switching means responsive to the stop signal to block the source from the power input connection means and switching means.

27. The tree harvesting machine as claimed in claim 22 wherein the main frame means includes front and rear frame means pivotally interconnected; the normally open input signal switch means further includes an in-line switch means closable in response to the front and rear frame means being positioned inline in a fore-and-aft direction to provide an electrical frame in-line signal to said switching means; and said switching means is responsive to the absence of the frame in-line signal to block the outputs from the driver means to block said source of current from said first solenoid means of said first, second, and third valve means.

28. The tree harvesting machine as claimed in claim 22 wherein the normally open input signal means further includes manually operable mode switch means selectable for deactivating at least a portion of said logic circuitry means for controlling the first, second, and third actuator means by the start and reset manual switch means and activating manual delimber cycle control means connected to the switching means for controlling the first, second, and third actuator means by selective operation of said manual delimber cycle control means.

* * * * *

UNITED STATES PATENT OFFICE
CERTIFICATE OF CORRECTION

Patent No. 3,938,566     Dated 17 February 1976

Inventor(s) Garn Farley Penfold and Andrew Paul Redman

It is certified that error appears in the above-identified patent and that said Letters Patent are hereby corrected as shown below:

Column 12, line 41, change "engagae-drive" to --engage-drive--;

Column 15, line 56, change "postions" to --position--;

Column 16, line 52, after "means" (second occurence) insert --and being selectively energizable for shifting the associated valve means--.

Signed and Sealed this

Nineteenth Day of October 1976

[SEAL]

Attest:

RUTH C. MASON
*Attesting Officer*

C. MARSHALL DANN
*Commissioner of Patents and Trademarks*